United States Patent
Hambric et al.

(10) Patent No.: US 7,400,357 B2
(45) Date of Patent: Jul. 15, 2008

(54) REMOTELY DELIVERED, SELF-DEPLOYED MULTI-FUNCTION SENSOR

(75) Inventors: Harry N. Hambric, Pembroke Pines, FL (US); Michael J. Jennings, Springfield, VA (US)

(73) Assignee: The United States of America as represented by the Department of the Army, Washington, DC (US)

( * ) Notice: Subject to any disclaimer, the term of this patent is extended or adjusted under 35 U.S.C. 154(b) by 629 days.

(21) Appl. No.: 11/008,207

(22) Filed: Dec. 10, 2004

(65) Prior Publication Data

US 2006/0125953 A1    Jun. 15, 2006

(51) Int. Cl.
*H04N 5/225* (2006.01)
*H04N 9/47* (2006.01)

(52) U.S. Cl. .................. 348/373; 348/143; 348/82
(58) Field of Classification Search .............. 348/373, 348/143, 82
See application file for complete search history.

(56) References Cited

U.S. PATENT DOCUMENTS

| | | | | |
|---|---|---|---|---|
| 3,573,724 A | * | 4/1971 | Komorida | 340/934 |
| 5,206,721 A | * | 4/1993 | Ashida et al. | 348/14.1 |
| 6,005,610 A | * | 12/1999 | Pingali | 348/169 |
| 6,275,258 B1 | * | 8/2001 | Chim | 348/211.12 |
| 6,424,373 B1 | * | 7/2002 | Misue et al. | 348/211.99 |
| 6,720,875 B2 | * | 4/2004 | Philippe | 340/541 |
| 6,924,838 B1 | * | 8/2005 | Nieves | 348/211.99 |
| 6,940,540 B2 | * | 9/2005 | Beal et al. | 348/169 |
| 2005/0179539 A1 | * | 8/2005 | Hill et al. | 340/539.1 |

* cited by examiner

*Primary Examiner*—Lin Ye
*Assistant Examiner*—Hung H Lam
(74) *Attorney, Agent, or Firm*—Andrew Romero; John Raubitschek

(57) ABSTRACT

The present invention is an encapsulated sensor suite that deploys remotely. After deployment, an imager in the sensor suite is raised by a variety of means and is capable of being turned by a motor that locks on to sounds coming from a potential target. The motor is actuated by three microphones that when used in concert, point the imager to the direction of the sound's origination. The imager is also activated by a seismic detector which is deployed at the base of the encapsulation. The encapsulation may be righted by soft to hard metal contacts that release the hard metal with sufficient force to flip the sensor to the correct side for deployment.

20 Claims, 5 Drawing Sheets

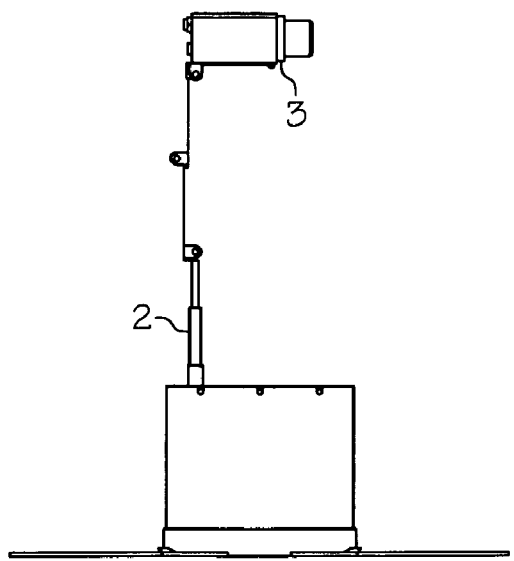
FIG. 1c
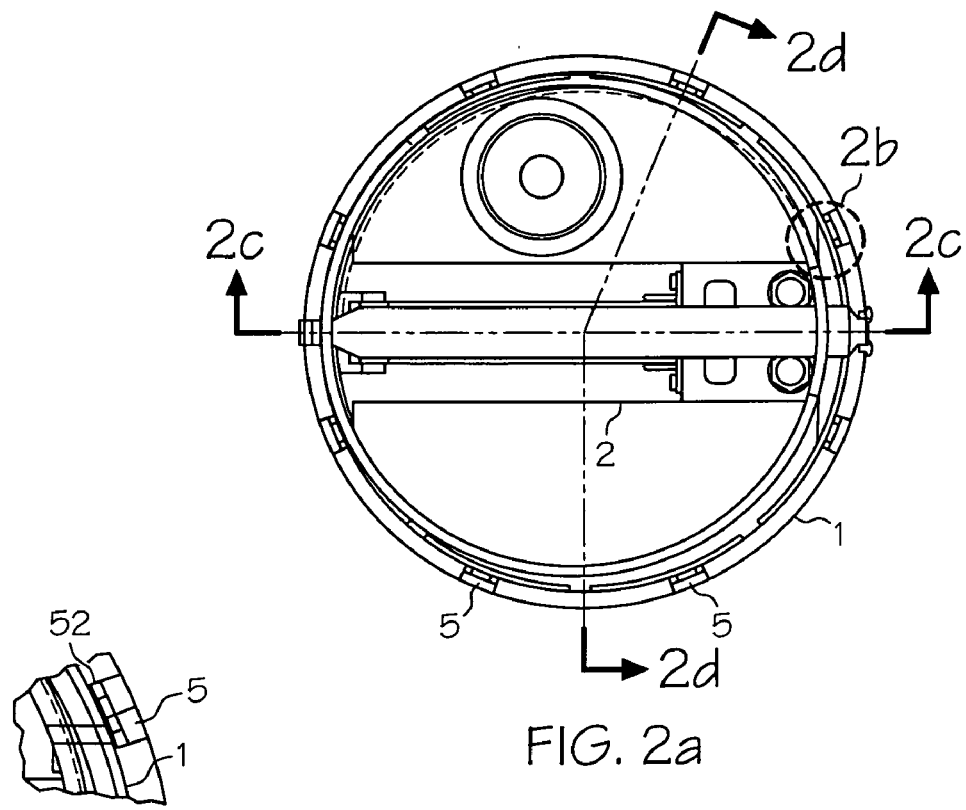
FIG. 2a
FIG. 2b

REMOTELY DELIVERED, SELF-DEPLOYED MULTI-FUNCTION SENSOR

GOVERNMENT INTEREST

The invention described herein may be manufactured, used, sold, imported, and/or licensed by or for the Government of the United States of America.

FIELD OF INTEREST

This invention relates to deploying sensors for monitoring purposes.

BACKGROUND OF THE INVENTION

Forward deployed sensors and/or parameter sensors are necessary for military and law enforcement applications. The current and projected size of imaging and other media sensors allow the development of very small multi-function sensors able to detect, characterize and identify targets in their immediate area. These sensors lend themselves to being deployed by hand, or from air or ground platforms.

However, actually deploying these sensors in a stable, effective manner has not been fully achieved. The present invention is a manner in which to deploy such sensors in a stable and cost-effective manner.

SUMMARY OF THE INVENTION

Accordingly, one object of the present invention is to deploy such sensors in a stable and cost-effective manner. The present invention achieves this objective by providing for an encapsulated sensor suite that deploys remotely. After deployment, an imager in the sensor suite is raised by a variety of means and is capable of being turned by a motor that locks on to sounds coming from a potential target. The motor is actuated by three microphones that when used in concert, point the imager to the direction of the sound's origination. To conserve power and limit detection from unintentional electronic emission, The imager and acoustic detector suite is also activated by a seismic detector which is deployed at the base of the encapsulation. The encapsulation may be righted by soft to hard metal contacts that release the hard metal with sufficient force to flip the sensor to the correct side for deployment.

BRIEF DESCRIPTION OF THE DRAWINGS

These and other objects of the invention will become readily apparent in light of the Detailed Description Of The Invention and the attached drawings wherein:

FIGS. 1a through c are cross-section views of one embodiment of the present invention. FIG. 1a shows the outer compartment of the present invention. FIG. 1b shows the sensor suite encapsulated in the outer compartment. FIG. 1c shows the sensor suite deployed from the outer compartment.

FIGS. 2a through f show other various cross-sections of the present invention. FIG. 2a is a top down cross-section of the present invention only showing 2 aspects of the invention. FIG. 2b is a detail showing a soft metal hard metal contact according to the present invention. FIG. 2c shows a cross-section through line C-C of FIG. 2a. FIG. 2d shows a cross-section through line D-D of FIG. 2a. FIG. 2e shows a cross-section of a detail of a deployment means. FIG. 2f shows a cross-section of a detail of a microphone position according to the present invention.

DETAILED DESCRIPTION OF THE INVENTION

The current and projected size of imaging and other media sensors allow the development of very small multi-function sensors able to detect, characterize and identify targets in their sector of protection. These sensor devices lend themselves to being deployed by hand, or from air or ground platform.

Figure 1A:
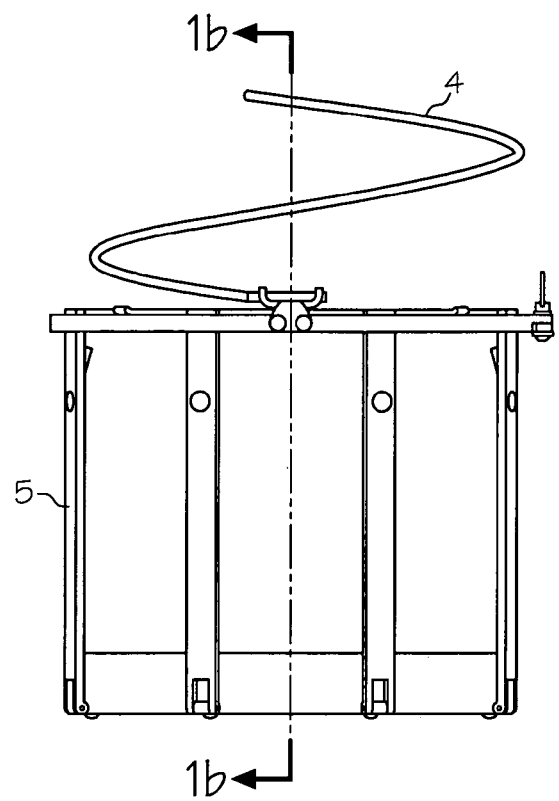
Figure 1B:
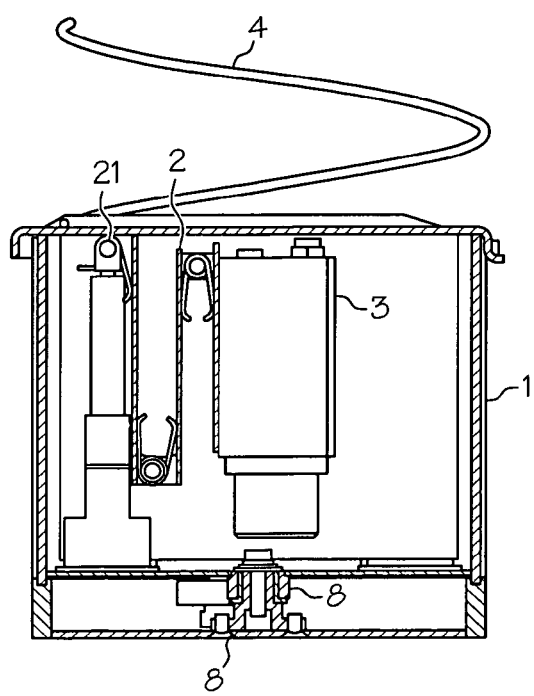

FIGS. 1a through c are various views of one embodiment of the present invention. FIG. 1a shows the outer compartment of the present invention. FIG. 1b shows a cross section view of the sensor suite encapsulated in the outer compartment through line B-B of FIG. 1a. FIG. 1c shows the sensor suite deployed from the outer compartment. As shown, the present invention includes an outer compartment 1 with a flat bottom and top. One side (the top side) is normally fashioned in a manner to allow an extendable arm 2 to be stowed inside the outer compartment 1 such that it does not protrude above the top surface when not deployed.

This arm (mast) 2 serves multiple functions. It is the sensor's antenna and holds imaging sensor 3. When released from its locking mechanism 21, it is forced into an extended position by (1) a spring at its rotating point, or (2) a pair of spring steel tapes shaped as mast components that extend vertically by spring power.

When extended, the arm 2 (rotating mast or steel tape versions) extends the imaging sensor (camera) 3 above the ground as necessary to see over/past foliage, low constructions. This action takes place in two phases.

Figure 3:
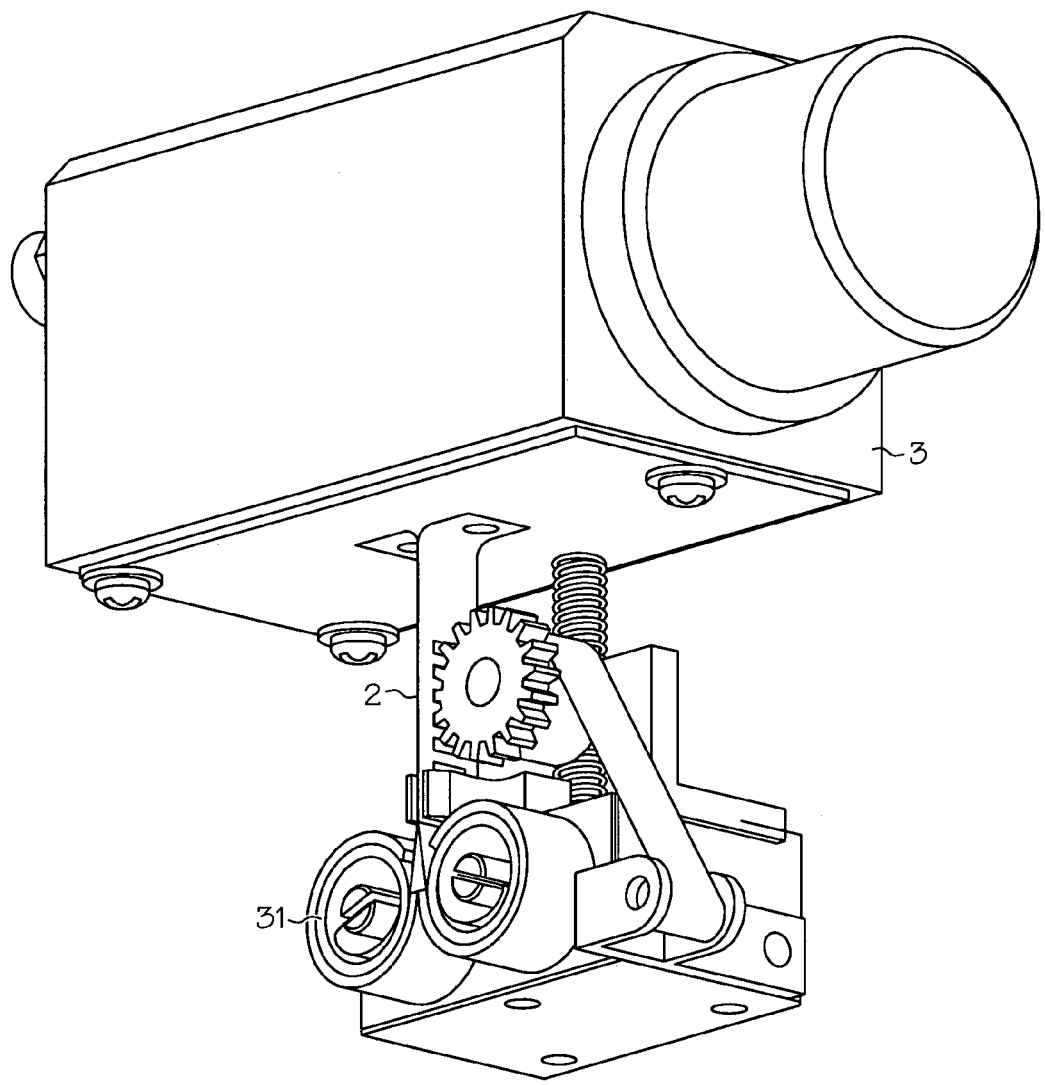
FIG. 3 is an illustration of another embodiment of the present invention.

The rotation of the arm 2 raises the top of the arm 2 out of the casing 1 and an extender spring pushes the arm 2 apart to further extend the distance. The length of the arm 2 is constrained by the diameter of the case 1 and the number of rotating points on the arm 2, or length of spring steel or partially curved tape. The steel tape embodiment (FIG. 3) extends the same distance, but the two lengths of steel tape are unwound from their storage spool 31 via gear 32 in a manner, which causes them to link as they unwind, forming one entity. The joined mast halves form a single mast 2 and are extended vertically with imager 3 and antennae on top. The mast deploying mechanism is insulated from the sensor and the imaging sensor 3 in such a manner that it can be used as the sensors' antenna.

The imaging sensor 3 (such as an infrared imager or other imaging sensor) is affixed to the end of the arm 2 in a manner that it will view parallel to the ground the outer compartment 1 is resting on.

Figure 2C:
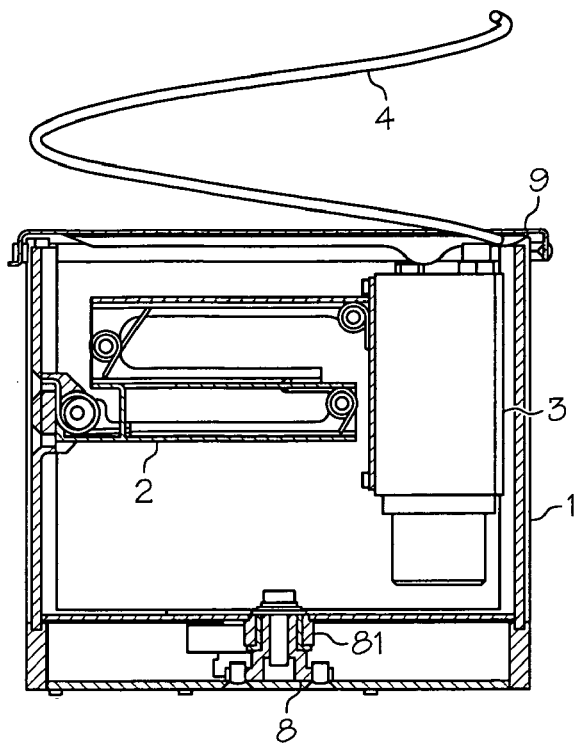
Figure 2E:
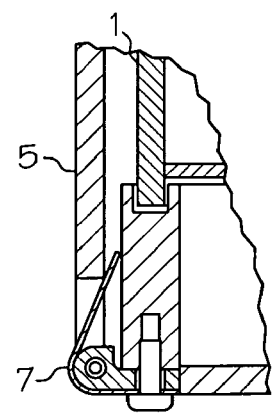
Figure 2D:
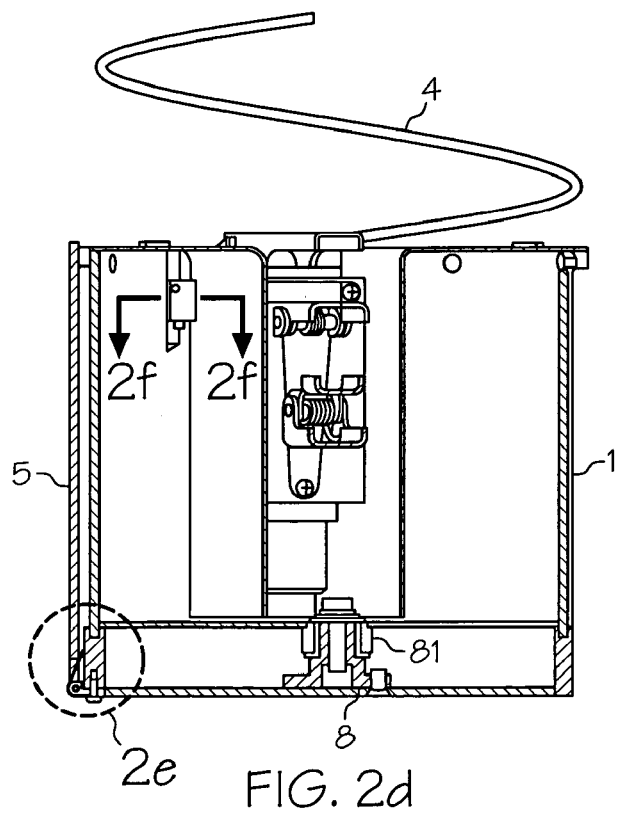
Figure 2F:
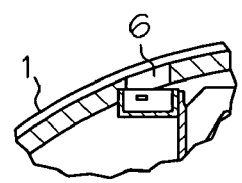

FIGS. 2a through f show other various cross-sections of the present invention. FIG. 2a is a top down cross-section of the present invention only showing 2 aspects of the invention. FIG. 2b is a detail showing a soft metal hard metal contact according to the present invention. FIG. 2c shows a cross-section through line C-C of FIG. 2a. FIG. 2d shows a cross-section through line D-D of FIG. 2a. FIG. 2e shows a cross-section of a detail of a deployment means. FIG. 2f shows a cross-section of a detail of a microphone position according to the present invention. As shown in FIG. 2a and detail FIG. 2f, three microphones assemblies 6 for acoustic sensing are mounted inside the outer compartment 1 with holes drilled in the compartment walls to allow sound to enter. The microphones 6 provide an alert mechanism to warn of target approaches, and through an imbedded algorithm designed to compare voltage input from the microphones 6, is able to direct rotation of the container to maintain an image of the target.

The bottom plate of the present invention serves as a seismic sensor's detection plate 8 (FIGS. 2*c* and *d*). It rests on or near the ground for detection of seismic events. As the plate detects seismic events they are transferred through the plate's rotating bearings 81 to the sensor's data processor.

The activation of the acoustic or seismic sensors causes two events. First a cueing (trip wire) signal is transmitted warning of a possible threat. Second, the case is rotated to face the camera 3 towards the cueing events. The energy derived from the electrical current produced by the microphones 6 is compared in such a manner that one microphone 6 serves as the base data receiver and is positioned zero or 180 degrees to the imager 3. The energy from the other two microphones is rapidly compared in such a manner that the electrical current flow direction is reversed so that it changes the direction of rotation of motor's rotation. These events allow the motor to continually rotate the imager 3 to maintain a view of the target emitting the sound. A seismic sensor 8 in the base of the sensor is a discriminator able to counter the "turn on" functions of the sensor logic, and can be programmed to act on, or not act on a specific seismic input. The imaging sensor transmits an image of the terrain and any possible threat events in the field of view every time it changes direction of rotation.

The imaging sensor 3 can also be programmed to stay "awake" and transmit images of one particular target, or the sensor container can rotate continually while the images are collected and transmitted. Obtaining real time images or radio frequency signals will require the antennae to be deployed in a vertical position. In this regard, the antennae will be attached to the camera-deploying arm 2. This design concept should be capable of optimizing signal transmission to line of sight distance. To prevent the individual sensor transmission range from being too short to be of benefit each sensor will be equipped with hard/soft-ware to form a chain of sensor transmitters capable of forwarding signals back to the sensor operator/monitor. In cases where the distance is extreme, the sensor transmissions will occur using signal repeaters built in specific sensors.

Figure 4:
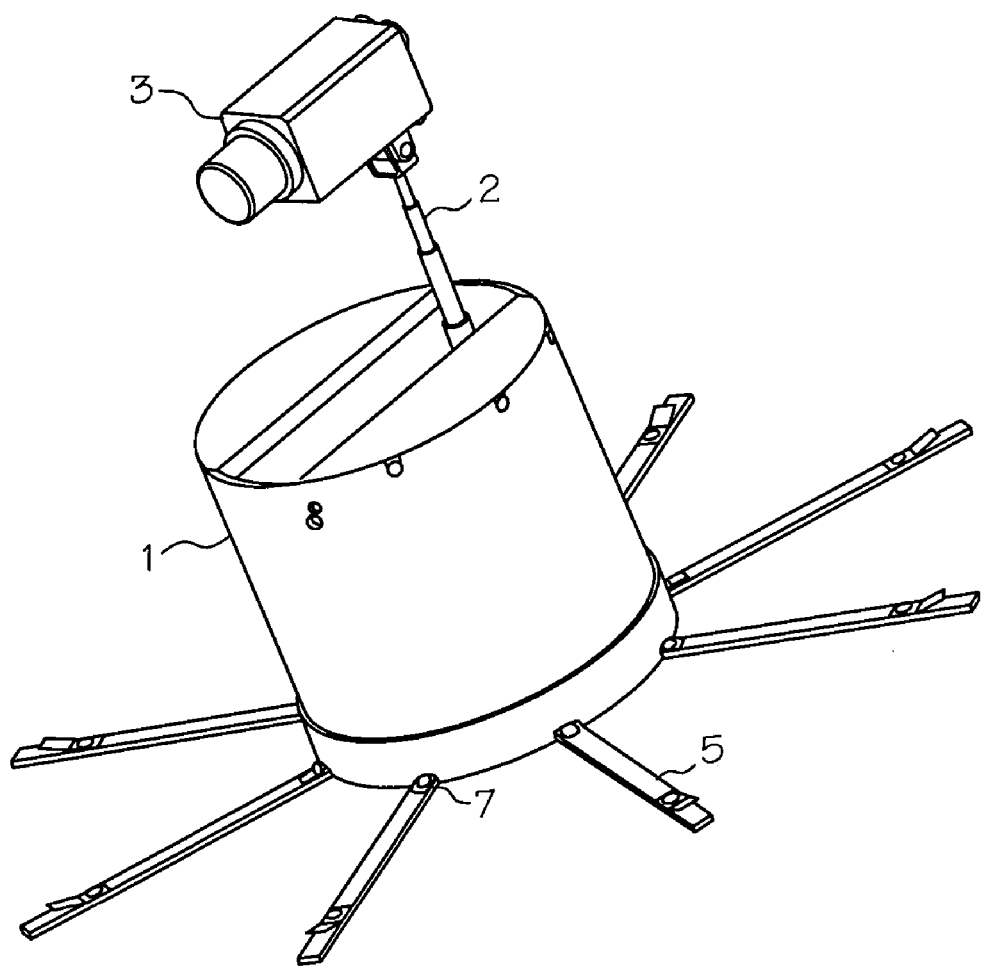
FIG. 4 is an illustration of still another embodiment of the present invention as deployed.

To aid in deployment in which the sensor container is dropped from moving platforms, a collar assembly 9 is affixed to the outside of the container. This collar has a length of helix spring (self righting spring) 4 still attached with the purpose of preventing the container from resting on its top surface. The spring has sufficient force to cause the container to fall over onto its side, e.g., a self righting spring 4 disposed on the top of the outer compartment, wherein the self righting spring deploys through a soft/hard metal contact that self releases. Also on the collar are pins, which insert into the container to lock the imager deployment components in place until they are supposed to deploy. The delay is initiated by a safety pin being removed as the container is deployed. This allows a soft metal link to come into contact with a harder metal link. After a set delay time, the hard metal overcomes the soft metal and the collar is free to drop off the container. As shown in FIG. 4, another soft/hard metal contact event occurs when the collar is removed and the spring loaded "righting" legs (arms) 5 deploy via spring 7 (FIG. 2*e*) to position the container upright, e.g., a plurality of self righting arms 5 jointed at the bottom of the outer compartment and each fixed with a spring and soft/hard metal contact such that when the soft/hard metal contact is broken the spring pushes on the self righting arm to force the outer compartment onto its bottom, and another hard/soft metal event occurs to cause the mast erecting assembly to activate.

What is claimed is:

1. A self deployed sensor comprising:
an outer compartment having a top and a bottom;
an extendable, rotatable arm that can be stored in and connected to the outer compartment;
an imaging sensor disposed on the extendable arm such that when the extendable arm is extended the imaging sensor has a predetermined position relative to the earth, the imaging sensor also being capable of being stored in the outer compartment;
a self righting spring disposed on the top of the outer compartment, wherein the self righting spring deploys through a soft/hard metal contact that self releases; and
a plurality of self righting arms jointed at the bottom of the outer compartment and each fixed with a spring and soft/hard metal contact such that when the soft/hard metal contact is broken the spring pushes on the self righting arm to force the outer compartment onto its bottom.

2. The self deployed sensor of claim 1 further comprising a plurality of microphones for acoustic sensing mounted inside the outer compartment, wherein the microphones provide an alert mechanism to warn of target approaches, and by comparing voltage inputs from the microphones the direction of a target is established.

3. The self deployed sensor of claim 2 with holes drilled in the outer compartment walls to allow sound to enter the outer compartment.

4. The self deployed sensor of claim 2 further comprising means for rotating the extendable arm to align the extendable arm with the target.

5. The self deployed sensor of claim 4 wherein the rotating means is a motor wherein energy derived from the electrical current produced by the microphones is compared in such a manner that one microphone serves as a base data receiver and is positioned to zero or 180 degrees to the imaging sensor and the energy from the other microphones is rapidly compared in such a manner that the electrical current flow direction is reversed so that it changes the direction of rotation of the motor's rotation.

6. The self deployed sensor of claim 5 farther comprising a seismic sensor disposed at the bottom of the outer compartment wherein the seismic sensor is a discriminator programmed to act on or not act on a specific seismic input.

7. The self deployed sensor of claim 5 wherein the extendable arm is a folded arm that uses springs to deploy the extendable arm in an upright manner.

8. The the self deployed sensor of claim 5 wherein the extendable arm is comprised of at least two metal tapes that can vertically unwind in unison.

9. The self deployed sensor of claim 5 wherein the extendable arm acts as an antenna for sending signals to and from the imaging sensor and microphones.

10. A method of manufacturing a self deployed sensor comprising the steps of:
providing an outer compartment having a top and a bottom;
providing an extendable, rotatable arm that can be stored in and connected to the outer compartment;
disposing an imaging sensor on the extendable arm such that when the extendable arm is extended the imaging sensor has a predetermined position relative to the earth, the imaging sensor also being capable of being stored in the outer compartment;

disposing a self righting spring on the top of the outer compartment, wherein the self righting spring deploys through a soft/hard metal contact that self releases; and disposing a plurality of self righting arms so that the arms are jointed at the bottom of the outer compartment and each arm is fixed with a spring and soft/hard metal contact such that when the soft/hard metal contact is broken the spring pushes on the self righting arm to force the outer compartment onto its bottom.

11. The method of claim 10 further including the step of mounting a plurality of microphones for acoustic sensing inside the outer compartment, wherein the microphones provide an alert mechanism to warn of target approaches, and by comparing voltage inputs from the microphones the direction of a target is established.

12. The method of claim 11 including the step of drilling a plurality of holes in the outer compartment walls to allow sound to enter the outer compartment.

13. The method of claim 11 further including the step of providing means for rotating the extendable arm to align the extendable arm with the target.

14. The method of claim 13 wherein the rotating means is a motor and including the steps of deriving energy from the electrical current produced by the microphones, comparing the energy in such a manner that one microphone serves as a base data receiver and is positioned to zero or 180 degrees to the imaging sensor, and rapidly comparing the energy from the other microphones in such a manner that the electrical current flow direction is reversed so that it changes the direction of rotation of the motor's rotation.

15. The method of claim 14 including the step of disposing a seismic sensor at the bottom of the outer compartment wherein the seismic sensor is a discriminator programmed to act on or not act on a specific seismic input.

16. The method of claim 14 wherein the extendable arm is a folded arm, and including the step of using springs to deploy the extendable arm in an upright manner.

17. The method of claim 15 including the step of composing the extendable arm of at least two metal tapes that can vertically unwind in unison.

18. The method of claim 15 including the step of sending signals to and from the imaging sensor and microphones with the extendable arm acting as an antenna.

19. The self deployed sensor of claim 1 wherein the extendable arm is a folded arm that uses springs to deploy the extendable arm in an upright manner.

20. The self deployed sensor of claim 1 wherein the extendable arm is comprised of at least two metal tapes that can vertically unwind in unison.

* * * * *